MULTIVIBRATOR AND COMPARATOR CIRCUIT UTILIZING SAME

Filed Aug. 6, 1959 3 Sheets-Sheet 1

INVENTORS
F. MANSFIELD YOUNG
THOMAS G. HAGAN
BY Kenway, Jenney, Witter & Hildreth
ATTORNEYS

MULTIVIBRATOR AND COMPARATOR CIRCUIT UTILIZING SAME

Filed Aug. 6, 1959 3 Sheets-Sheet 2

INVENTORS
F. MANSFIELD YOUNG
THOMAS G. HAGAN
BY Kenway, Jenney, Witter & Hildreth
ATTORNEYS INVENTORS
F. MANSFIELD YOUNG
THOMAS G. HAGAN
BY Kenway, Jenney, Witter & Hildreth
ATTORNEYS United States Patent Office 3,074,029

Patented Jan. 15, 1963

3,074,029
MULTIVIBRATOR AND COMPARATOR CIRCUIT UTILIZING SAME

Frink Mansfield Young, Boston, and Thomas G. Hagan, Brookline, Mass., assignors to Adage, Inc., Cambridge, Mass., a corporation of Massachusetts Filed Aug. 6, 1959, Ser. No. 832,040
30 Claims. (Cl. 331—113)

Our invention relates to an improved multivibrator and to a comparator circuit, such as is found in analog-to-digital converters of the programmed feedback type, which utilizes our improved multivibrator. More particularly, our invention relates to an improved free-running transistor multivibrator whose timing cycle does not repeat until after the output pulse is generated. Further, our invention relates to an improved comparator circuit for determining on which of two leads a pulse will appear, the determination as to which of the two leads being dependent upon the polarity of an input voltage. The comparator circuit may also be used to generate a "signal" or "no signal" on a single lead dependent upon the polarity of an input voltage.

Multivibrators are, of course, common devices and have been known for a number of years. However, in the past, almost all multivibrators have consisted of two similar vacuum tube amplifiers, or of two transistor amplifiers utilizing transistors of the same type, i.e. both amplifiers use transistors of the PNP type or of the NPN type. The output of each of the amplifiers is inverted from the input. In general, the output signal of one of the amplifiers is connected as the input of the other and vice versa. Thus the device will have two stable states, in which one of the amplifiers is conducting, holding the other cut off, and the reverse. By suitable circuitry multivibrators have also been made which are free running, i.e. that continuously shift from one stable condition to the other without the necessity of applying an external signal to the circuit. In general, in free-running multivibrators of the type heretofore used, the timing signal determining the length of, for example, the "off" period of one element was initiated at the time when the element changed state from the "off" to the "on" condition, rather than when it changed from the "on" to the "off" condition. In many circuits where these circuits are used as pulse generators and the "on" condition of an element represents the period of pulse generation, it is desirable to regenerate the timing waveform after rather than before the pulse is generated. The timing waveform may then be utilized elsewhere in the circuit for other purposes if desired, without being affected by the pulse length. Further, if a very low duty cycle is desired, as is the case where very short pulses are to be generated, a circuit of this type is desirable. Multivibrators of the type decscribed are disclosed more fully in Hunter, Handbook of Semi-Conductor Electronics, McGraw-Hill Book Co. (1956) at pages 14–22 to 14–24.

A circuit which has heretofore been built which utilizes two complementary transistor amplifiers is the so-called "latch" circuit. In this circuit, the output signal from one transistor is connected as the input to the other transistor. In a circuit of this type the two transistors are either both conducting or both non-conducting depending upon which of two inputs was the last to be energized. A "latch" circuit of this general type is disclosed in the above cited reference at pages 15–52. This circuit as mentioned, does not function as a multivibrator, but functions only in response to input signals.

In general, we have found that a substantially improved multivibrator may be made which utilizes two amplifiers each of which uses a single transistor, of complementary type. We arrange the circuit of the multivibrator such that one of the two transistors is "on" or conducting almost all the time. The other transistor is turned on only for the period when it is desired to generate a pulse, and is off during the remainder of the time. By applying suitable clamping potentials to the circuit, and limiting the excursion of voltages therein, we have found that we can make a multivibrator, which is free running, and which is substantially independent of the parameters of the transistors. Rather, in multivibrators made according to our invention, the period of the multivibrator is dependent principally upon the relatively stable values or resistors and capacitors, and upon the ratios of voltages. All of these things can be determined with substantial precision, and accordingly, in the multivibrators made according to our invention, we achieve substantial stability of the multivibrator period.

Also, in multivibrators made according to our invention the timing waveform which initiates a change in state of one of the active elements of the multivibrator is not terminated until the element returns to its initial state, which is an advantage in some applications. Further, our multivibrator permits an output waveform having a very short duty cycle—i.e. ratio of time the output is "on" to the time when no output appears. We have been able to achieve duty cycles of the order of $1/10^6$ for example using the circuit to be hereinafter described. In many pulse circuit applications this is a desirable property.

As previously mentioned, we have found that the improved multivibrator made according to our invention may be utilized to provide a substantially improved comparator for use in analog-to-digital converters of the programmed feedback type. In analog-to-digital converters of this type, a digital-to-analog converter is connected to a digital storage register. This digital-to-analog converter provides an output signal which is directly proportional to the number stored in the register. This output signal is compared with the analog input signal which it is desired to convert, and the difference signal is amplified and applied to a comparator. If the difference signal is of one polarity, indicating that the number in the digital storage register is less than the analog input signal, it is desirable to supply pulses on an output lead which, after passing through a logical circuit, are used to increase the value of the number stored in the register. On the other hand, if the polarity is such that it indicates that the analog signal is less than the signal from the digital-to-analog converter, then it is desirable to stop the converter operation or take some other action and this is indicated by the fact that pulses are supplied on a second output lead from the comparator. An analog-to-digital converter utilizing a comparator of this type is disclosed in our copending application entitled "Improved Analog-to-Digital Converter" filed on August 6, 1959, Serial No. 832,039 which is assigned to the assignee of the present invention. While comparators generally are known, we prefer to use the comparator of the type herein described in the above-identified copending application.

The comparator of our invention will be described as supplying pulses on one or the other of two output leads depending upon the polarity of the input voltage to the circuit. It will be understood, however, that depending upon the system configuration, the comparator may either supply pulses or not supply pulses on a single output lead to indicate the two conditions. Our invention may be used for this type of comparator by using only the appropriate one of the two output leads provided.

One of the major problems with comparator circuits as heretofore designed for use in programmed feedback analog-to-digital converters, is that of pulse feedback from the output pulse to the input signal. Where the input signal is very close to 0 being only very slightly positive or very slightly negative the coupling between the output pulse and the input signal may effect the input signal and cause poor pulse shapes, or indeed pulses on both output leads, which undesirably affects the operation of the device. However in comparators made according to our invention, we have found that we obtain a clean-cut decision and can effectively prevent any possibility of a pulse appearing on both output leads of the comparator. This substantially improves the operation of analog-to-digital converters which utilize comparator circuits made according to our invention. Further, by appropriate feedback arrangements the output signal is prevented from causing shortened pulses, or pulses of poor waveform.

Accordingly, a principal object of our invention is to provide an improved free running transistor multivibrator. Another object of our invention is to provide an improved multivibrator of the type described capable of having a very short duty cycle. Still another object of our invention is to provide a pulse-generating multivibrator, in which the timing waveform is regenerated at the end of the pulse rather than at its beginning.

A still further object of our invention is to provide a transistor multivibrator using complementary transistors. Still another object of our invention is to provide a transistor multivibrator of the type described which produces sharply defined pulses similar to those produced by a blocking oscillator at uniform periodic intervals. A still further object of our invention is to provide a transistor multivibrator circuit of the type described which is simple and economical in construction. Yet another object of our invention is to provide an improved comparator circuit for use with analog-to-digital converters. A further object of our invention is to provide an improved comparator circuit of the type described which utilizes our improved multivibrator circuit.

Still a further object of our invention is to provide a comparator circuit of the type described which combines the pulse generation and pulse selection functions in a single circuit. Yet a further object of our invention is to provide a comparator circuit of the type described which completely prevents the possibility of two pulses appearing simultaneously on the two output leads thereof. Other and further objects of our invention will in part be obvious and will in part appear hereinafter.

Our invention accordingly comprises the features of construction, combination of elements, and arrangements of parts which will be exemplified in the constructions hereinafter set forth, and the scope of our invention will be indicated in the claims.

For a fuller understanding of the nature and objects of our invention, reference should be had to the following detailed description taken in connection with the accompanying drawings in which:

FIG. 1 is a schematic circuit diagram of one embodiment of an improved multivibrator made according to our invention;

FIGS. 2*a*, *b*, *c* and *d* are plots of voltage waveforms as a function of time as these voltages appear at the designated points in the circuit of FIG. 1;

I. THE MULTIVIBRATOR

A. *Construction*

Figures 1, 2:
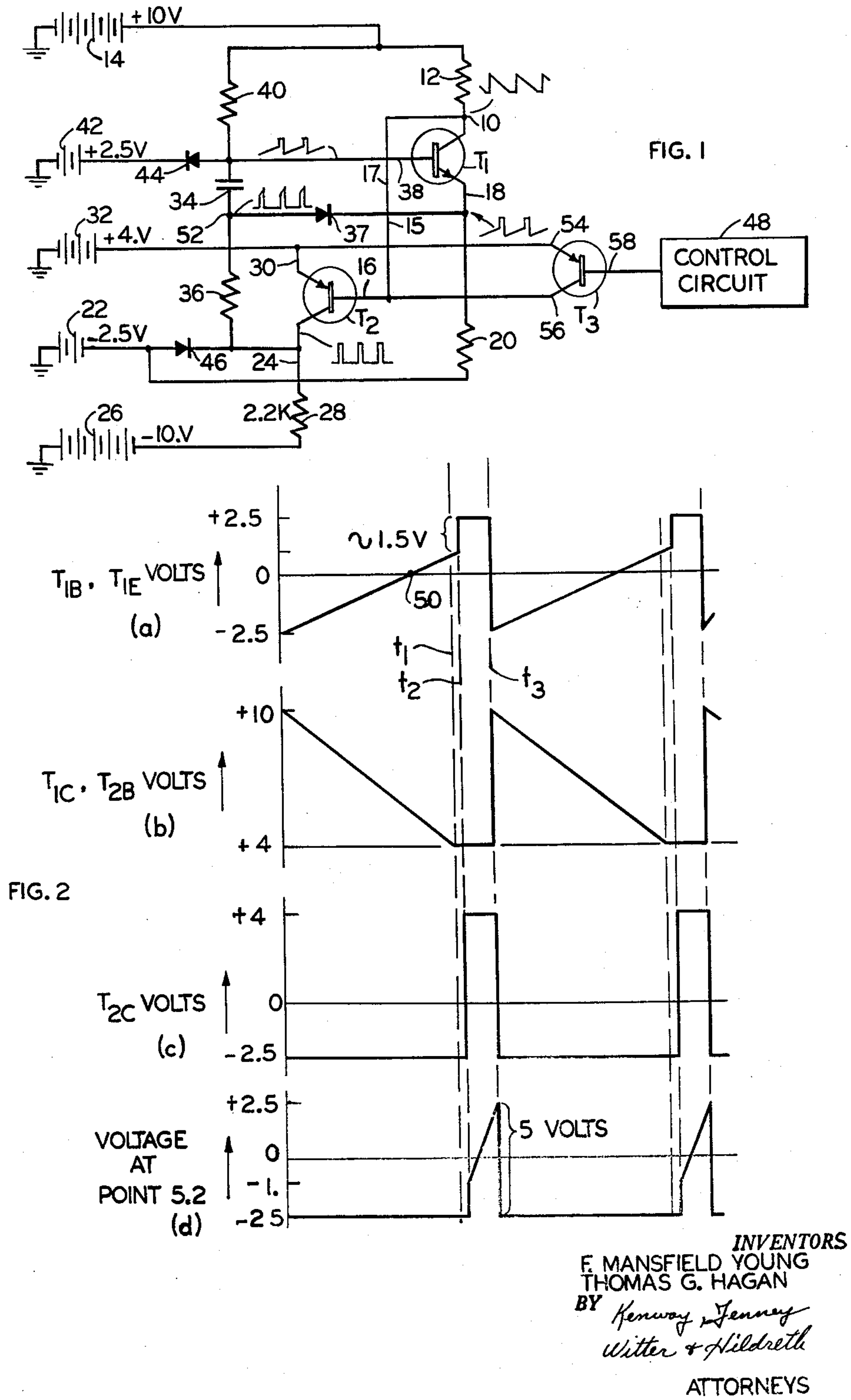

As shown in FIG. 1, two amplifiers using transistors labeled respectively $T_1$ and $T_2$ are used in the multivibrater, transistor $T_1$ being a NPN type while transistor $T_2$ is a PNP type. As illustrated, the collector 10 of transistor $T_1$ is connected through a resistor 12 to a source of positive voltage 14, illustratively shown as being +10 volts. The collector 10 of transistor $T_1$ is also connected directly to the base 16 of transistor $T_2$ by lead 17. The emitter 18 of transistor $T_1$ is connected through a resistor 20 to a voltage source 22, the voltage source 22 being illustratively shown as being a negative 2.5 volt source. The collector 24 of transistor $T_2$ is connected to a source of negative potential 26 through a resistor 28. Source 26 is illustratively shown as being a negative 10 volt source. The emitter 30 of transistor $T_2$ is connected to a source of positive potential 32, this source being illustratively shown as being of approximately +4 volts magnitude.

The condenser 34 in series with a resistor 36 is connected between the collector 24 of transistor $T_2$ and the base 38 of transistor $T_1$ the junction of these two elements being shown at 52. A diode 37 is connected between point 52 and the emitter 18 of transistor $T_1$. While we have illustrated a resistor in series with condenser 34, in some applications of the multivibrator, as will be hereinafter explained, this resistor may be omitted.

A source of positive voltage, illustratively shown as the source 14 is also connected to the base 38 of transistor $T_1$ through a resistor 40. The base 38 of transistor $T_1$ is clamped to a source of positive voltage 42 illustratively shown as a +2.5 volt battery through the diode 44. This clamping arrangement prevents the voltage at the base from rising above the +2.5 volt level. In similar fashion, the collector 24 of transistor $T_2$ is also clamped to prevent it from falling below the —2.5 volt level by the diode 46 which is connected in series between the collector 24 and the potential source 22. Transistor $T_3$ and the control circuit 48 associated therewith are used to control the function of the transistor, and their operation will be hereinafter explained.

B. *Operation*

As has been previously noted, the multivibrator is free running and it is not possible to select a time when it is in a quiescent state in order to explain its operation. However, from an inspection of FIG. 1 it will be apparent that when voltage is initially applied to the multivibrator, the potential at the base 38 of transistor $T_1$ will begin to rise as condenser 34 charges through resistor 40 the rate of rise being determined by the sizes of resistor 40, condenser 34 and resistor 36 if present. Accordingly, it will be assumed initially in discussing the operation of the circuit that the voltage at the base 38 is 0 and rising. It will be observed that the voltage at the base of transistor $T_1$ and that of the emitter 18 will be substantially identical except for the emitter-base diode drop. The waveform of the voltage appearing at this point is shown in FIG. 2*a*, the initial point selected for describing the operation of the multivibrator being indicated at 50 thereon. As the voltage on base 38 of transistor $T_1$ rises, the voltage at the collector 10 will drop from its maximum value, following the rise of the base voltage, since transistor $T_1$ is connected as a conventional phase inverting amplifier. This is illustrated in FIG. 2*b* wherein the voltage at the collector 10 is shown as a descending ramp during the period that the base voltage is rising. As long as the voltage at the collector 10 is greater than the voltage on the emitter 30 of transistor $T_2$, the emitter-base diode of transistor $T_2$ will be cut off, and the transistor will not conduct. Accordingly, as shown in FIG. 2*c*, the voltage at the collector is clamped, during the period when the base voltage of transistor $T_1$ is rising, by the clamp diode 46 at —2.5 volts.

As the voltage at the base 38 of transistor $T_1$ rises due to the charging of condenser 34 through resistor 40, the collector voltage 10 of transistor $T_1$ and the base voltage 16 of transistor $T_2$ will continue to drop until the voltage at the base of transistor $T_2$ equals the voltage supplied to the emitter 30. At this point, transistor $T_2$ will begin to conduct. The time of initial conduction is indicated on the diagrams of FIGS. 2*a*, *b*, *c* and *d* as time $t_1$. At this time, for example, the vase voltage 38 may be approximately 1 volt, depending upon circuit parameters. Since the base voltage is substantially 1 volt, the voltage at the emitter 18 will also be substantially 1 volt at this time.

As soon as conduction begins in transistor $T_2$, an increased current will flow through the collector resistor 28, raising the potential at the collector 24. However, the potential at the collector 24 of transistor $T_2$ cannot rise immediately since current was flowing through diode 46 to clamp the potential at the collector 24 at a value of −2.5 volts, which is substantially less in absolute magnitude than the −10 volts supplied by the source 26. Accordingly, the transistor must first develop sufficient current flow through the resistor 28 to equal the current which had been flowing through diode 46 before the collector 24 can rise above the potential of source 22. When this time $t_2$ as shown in FIG. 2 is reached, the potential at the collector 24 begins to rise. The slight interval $t_1$ and $t_2$ is important in the operation of the comparator circuit as will be hereinafter explained. It will be observed that once conduction begins in transistor $T_2$, the base 16 and therefore collector 10 of transistor $T_1$ cannot fall below the 4 volt level to which the emitter is connected because of the clamping action of the emitter-base diode of transistor $T_2$. Accordingly, the voltage at the base 16 remains at the 4 volt level set by source 32 as soon as conduction occurs and remains at this level throughout the conducting period.

After sufficient current is flowing through the transistor $T_2$ so that the collector current equals the current previously flowing through the clamping diode 46, the voltage at the collector 24 begins to rise. This rise is coupled through resistor 36 (if present) and capacitor 34 to the base 38 of transistor $T_1$. The application of a positive voltage to the base increases the current flow through transistor $T_1$ which means increased current must flow through its collector. However, since no additional current can flow through resistor 12, both of its ends being clamped, this current must be an increased base current supplied from transistor $T_2$. This increased base current causes an increased current flow through $T_2$ and causes the collector 24 thereof to rise still further in voltage, which rise is coupled through capacitor 34 to the base of $T_1$. This action is thus regenerative, and the voltage at the base 38 jumps from the approximate 1 volt level where conduction of transistor $T_2$ began to the positive clamp voltage of +2.5 volts where it is clamped. This is a rise of approximately 1.5 volts from the point where conduction was initiated. The voltage at the base 38 remains at this level throughout the remainder of the conduction period of transistor $T_2$. The voltage at the collector 24 of transistor $T_2$ also rises the maximum amount that it can, i.e. from −2.5 to approximately +4 volts where it remains during the entire conduction period. The voltage at the point 52 cannot, however, rise immediately because the charge on the condenser 34 cannot be changed immediately. Accordingly, point 52 rises only the same 1.5 volts as the base of transistor $T_1$. However, at the same time, collector 24 is at a +4 volt level. Accordingly, the condenser 34 attempts to charge to the difference in between the +2.5 volts of the base 38 and the 4 volts at collector 24. This is indicated by the sloping rise from the −1 volt to the +2½ volt level in FIG. 2*d*.

The charging of condenser 34 (through resistor 36 if included) continues until the voltage on the anode of diode 37 exceeds its cathode voltage and the diode conducts. It will be recalled that the emitter 18 is at substantially the same potential as the base 38 of transistor $T_1$ because of the emitter base diode. Accordingly, during the period of conduction of transistor $T_2$, the emitter 18 is at approximately +2.5 volts. When the voltage at the point 52 reaches approximately this potential, diode 37 conducts and the current flowing through diode 37 and resistor 20 raises the potential of emitter 18 above the potential of the base 38. This causes transistor $T_1$ to become non-conducting for a short period and its collector potential as measured at 10 immediately rises to +10 volts as indicated in FIG. 2*b* at time $t_3$. In so doing, the rise in collector voltage shuts off transistor $T_2$ and accordingly the potential at collector 24 drops immediately to −2.5 volts. This action is again regenerative and very rapid. It will be recalled that the conduction of diode 37 took place when there was substantially 0 voltage (and therefore a zero charge) on the condenser 34. Accordingly, the drop in voltage at the collector 24 also drops the base 38 of transistor $T_1$ to −2.5 volts. Condenser 34 again begins to charge to the +10 volt level through resistor 40, and the cycle begins again.

To summarize, the potential at the collector 10 of transistor $T_1$ decreases as the base 38 rises, in response to the increase in potential on condenser 34. When the voltage at the collector 10 drops sufficiently, it causes transistor $T_2$, which is normally non-conducting, to begin conduction. Until the current flow in transistor $T_2$ equals the clamping current the collector voltage remains fixed. However, when the current exceeds this value, the voltage at the collector of transistor $T_2$ rises and is coupled to the transistor $T_1$ through the condenser 34. This rise in potential at the collector 24 is regenerative, and the voltage at the base 38 of transistor $T_1$ rises until it is clamped at +2.5 volts. At this point collector 24 of transistor $T_2$ has risen to a positive 4 volt level, but point 52, at the junction of resistor 36 and condenser 34 has risen only 1.5 volts because of the positive clamp applied thereto. The voltage at the lower end (as seen in FIG. 1) of a +2.5 volt level at which time the diode 37 conducts, momentarily shutting off transistor $T_1$. The sudden rise at the collector of transistor $T_1$ which accompanies its momentary shut-off is coupled to the transistor $T_2$ and causes conduction through transistor $T_2$ to cease. Collector voltage 24 drops to the clamped −2.5 volts and this sudden drop is coupled by condenser 34 to the base 38 of transistor $T_1$. The condenser 34 immediately begins to charge again through resistor 40, and the cycle begins a second time.

The waveforms shown in FIG. 2 have been exaggerated for purposes of clarity; in actual practice, depending upon the values of resistor 40 and capacitor 34, the period when $T_2$ is non-conducting is very, very short as compared to the period when it is conducting. It is also to be noted that the resistor 36 may be omitted from the circuit if desired. The condenser 34 will then charge very rapidly from the collector voltage, which will substantially narrow the pulse produced. The size of resistor 36 may be selected to precisely control the width of the pulse desired.

It will be observed, that the period of the multivibrator is determined by the size of the condenser 34 and the resistor 40 and the clamped voltages applied to the base 38 and collector 24 of transistors $T_1$ and $T_2$ respectively. These clamping voltages can be held substantially constant using modern regulation techniques and accordingly, the period of the multivibrator is essentially independent of the characteristics of transistors $T_1$ and $T_2$. It will also be observed that the timing waveform, the ramp of FIG. 2*b*, is not regenerated until the end of the pulse appearing at the collector of transistor $T_2$ i.e. at time $t_3$. As previously noted, this is in contrast to other multivibrators where the timing waveform is regenerated at the time the pulse output begins i.e. time $t_2$.

Transistor $T_3$ is a control transistor which effectively short circuits the emitter base diode of transistor $T_2$ when it is conducting. As will be observed, the emitter 54 of transistor $T_3$ is connected to the voltage source 32, the same voltage source to which the emitter 30 of the transistor $T_2$ is connected. The collector 56 of the transistor $T_3$ is connected directly to the base 16 of transistor $T_2$ and the base 58 of transistor $T_3$ is connected to the control circuit 48.

The base 58 is normally returned to a negative potential. Thus, transistor $T_3$ is conducting, and current flows through the lead 17 through the collector 56 of the transsistor 58 to the control circuit. The fact that transistor $T_3$ is "on" effectively prevents any base current from flowing in transistor $T_2$, and thus effectively prevents $T_2$ from ever conducting. Thus, in operation, the multivibrator sequence will proceed to a point where the voltage at the collector 10 of transistor $T_1$ and at the base 16 of transistor $T_2$ is +4 volts, and base 38 is at +2.5 volts. If transistor $T_3$ were not present, base current would have begun to flow in transistor $T_2$ with the resulting operation described above. However, with transistor $T_3$ present, and conducting, no base current flows in transistor $T_2$ but all current flows as collector current in transistor $T_3$. Thus the multivibrator cycle is effectively stopped with the voltages described present at the appropriate terminals.

The application of a positive voltage to the base 58 of transistor $T_3$ from the control circuit 48 will shut transistor $T_3$ off and permit base current to flow in transistor $T_2$. As soon as base current flows in transistor $T_2$, the cycle will commence and the waveforms shown in FIG. 2 will be generated. If at the time that the point in the cycle corresponding to time $t_1$ is reached in the next multivibrator cycle, the base 58 of transistor $T_3$ has again been restored to a negative voltage with respect to the emitter 54, the cycle will again be interrupted and base 38 will continue to rise in voltage until it reaches the +2.5 volt potential of source 42. Thus, positive pulses applied from the control circuit to the base 58 effectively determine the time when pulses will appear at the collector 24 of transistor $T_2$. There is a very slight delay between the appearance of a positive signal at the base 58 and the pulse at the collector 24, corresponding to the time difference between the times labelled respectively $t_1$ and $t_2$ in FIG. 2. As previously explained, this corresponds to the time required for the collector current of the transistor $T_2$ to equal the clamping current previously supplied by the diode 46.

II. THE COMPARATOR

A. *Introduction*

Figure 3:
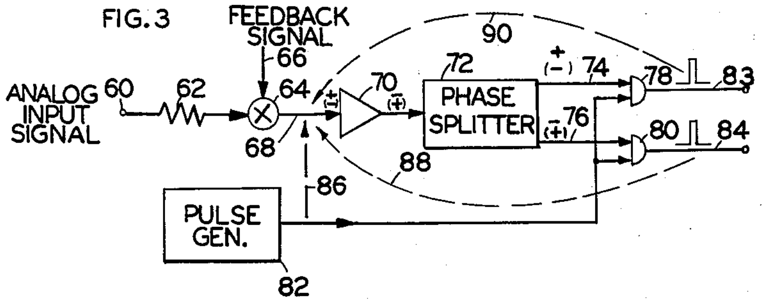
FIG. 3 is a block diagram of the conventional comparator circuits heretofore used in programmed analog-to-digital converters and in other applications.

FIG. 3 illustrates a comparator which has sometimes been used in analog-to-digital converters and other digital devices utilizing analog input signals. As shown therein, an analog input signal which is to control on which of two output leads an output pulse is to appear (or, whether or not a pulse is to appear on one of two output leads) is applied to the terminal 60 and connected through resistor 62 to the summing point 64. A feedback signal representing the state of the digital device (the feedback signal being in analog form) is also connected via lead 66 to summing point 64. The output from summing point 64 appearing on lead 68 is the difference between the analog input signal and the feedback signal. This difference signal is amplified by the amplifier 70 and applied generally to a phase splitter 72 which provides a signal corresponding in polarity to the difference signal on lead 74 and a signal of opposite polarity on the lead 76. Each of these leads are connected to the gates 78 and 80 to which is also connected a pulse train from the pulse generator 82. In general, for a positive difference signal, the output of amplifier 70 may be negative for example and the output of phase splitter 72 on lead 74 is positive and that on lead 76 is negative. If the convention is adopted that a positive output signal opens the gates 78 and 80, pulses fed to the gate 78 will be passed to the lead 83 when the difference signal has a positive polarity and to the lead 84 when the difference signal has a negative polarity. Pulses appearing on lead 83 for example may be supplied to registers in a digital analog converter to increase the count therein until the difference signal changes in polarity. Pulses supplied on the lead 84 may be used to control the operation of the device and to shut it off when the polarity goes negative. If the system in which the comparator is used is the type that depends for its operation on the presence or absence of pulses, the phase splitter 72, the gate 80 and the output lead 84 may be omitted; the output of the amplifier 70, after inversion, may then be connected directly to the gate 78.

In comparators of the type shown in FIG. 3, coupling introduced between the various circuits sometimes causes a pulse to appear on both output leads, or the pulse on one of the output leads to be badly misshapen. Such poorly shaped pulses do not correctly operate the digital equipment with which they are used.

The reason for the double pulsing or the poorly shaped pulses is the coupling indicated by the dotted arrows 86, 88 and 90. If for example the pulse generator 82 supplies positive pulses, and the input signal is almost zero but very slightly negative, these positive pulses generated by the clock pulse generator 82 will be coupled to the input and change the value of the potential there. This is indicated by the arrow 86. Thus, erroneous readings may be obtained because an incorrect gate will be opened. If the coupling is transient, or uncertain, as it often is in electronic circuits, it may develop that the gate is only open for a portion of the total time. As indicated by the arrows 88 and 90, there is also coupling from the output to the input leads. Again assuming that the pulse generator generates positive pulses, if the input is close to zero but very slightly positive, then a pulse on the lead 83 is desired. A positive pulse on this lead will merely act to increase the positive potential at the input to amplifier 70 through coupling and accordingly, such feedback is regenerative and no uncertainty or indecision results.

However, if the input is close to zero but slightly negative, and a positive pulse appears on lead 84, the coupling indicated by the arrow 88 would change the input voltage to the amplifier 70 during the time of its appearance in the opposite direction, thus causing indecision and uncertainty. This change in voltage at the input of the amplifier 70 may cause one gate to close prematurely shutting off part of the pulse before it is fully passed by the gate. The other gate may then open, passing a part of the pulse also. Thus, with comparators of this type, the feedback effect from the clock pulses and from the output leads when the input signal is very close to zero has sometimes caused improper performance.

Figure 4:
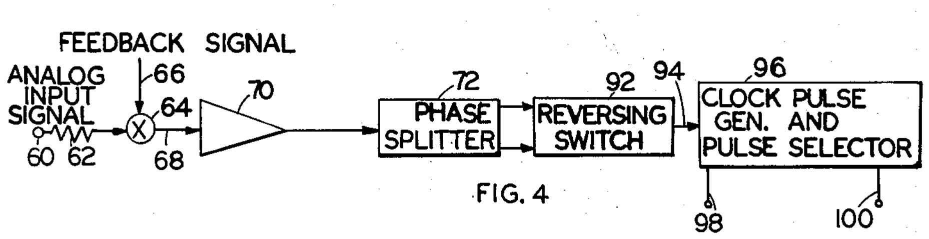
FIG. 4 is a block diagram of the improved comparator made according to our invention.

In FIG. 4 we have illustrated in block diagram form an improved comparator made according to our invention. As shown therein, in comparators made according to our invention the output from the phase splitter 72 is fed to a reversing switch 92 having an output lead 94. The output lead from the reversing switch 94 is connected to a clock pulse generator and pulse selector 96. The reversing switch 92 reverses the state dependence of the output lead 94 upon the polarity of the difference signal input appearing on lead 68. This reversing switch is described in our copending application previously referred to in greater detail. In general, in order to understand the function of the clock pulse generator and pulse selector 96 it is only required to know that the reversing switch output lead 94 can vary in potential from +½ volt to −½ volt for example, the polarity of the input voltage of lead 94 indicating on which of the two output leads pulses from the pulse generator are to appear. If the input signal on lead 94 is positive, an output pulse is desired at terminal 98 and if the input signal is negative with respect to ground, an output pulse is desired on the lead 100.

In general, in comparators made according to our invention, coupling of the sort indicated by the arrow 86 is avoided by making the clock pulse generator and the selection circuits a part of the same circuit and generating the clock pulse after lead selection has been made. This minimizes the coupling which might occur from the pulse generator itself directly to the input terminal. Thus, the clock pulse generator has a minimum effect upon the input lead. Further, we provide that once a selection has been made between one or the other of the two output leads, no pulse can be generated on the other output lead. Finally, in an improved comparator made according to our invention we provide regenerative coupling in the path corresponding to the arrow 88 in FIG. 3, to overcome any degenerative coupling and to insure minimum effect upon the output selection by the generation of the input signal.

B. *Construction And Operation*

Figure 5:
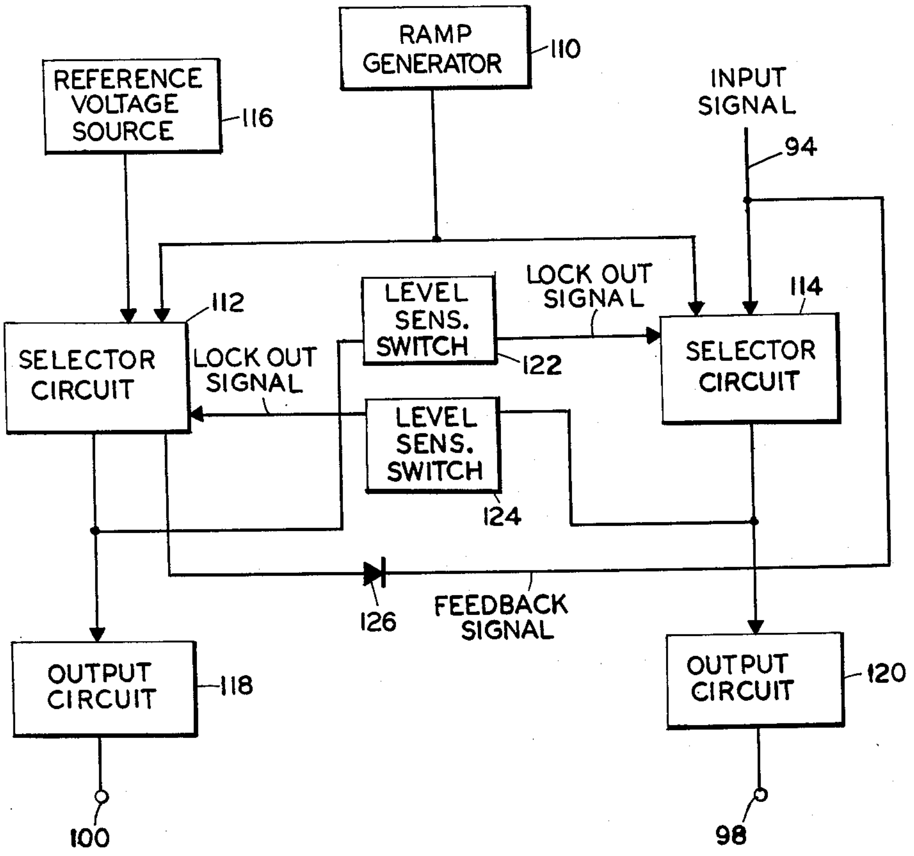
FIG. 5 is a block diagram of the clock pulse generator and pulse selector circuit of FIG. 4.

FIG. 5 is a generalized block diagram of our improved clock pulse generator and pulse selector circuit. As shown therein, the circuit includes a ramp generator 110 which generates a recurring output waveform similar to the waveform of FIG. 2*b*. The ramp output signal is supplied to two identical selector circuits 112 and 114; another input signal is supplied to each of these circuits, a fixed reference voltage from a reference voltage source 116 for circuit 112 and the input signal on lead 94 in the case of circuit 114. The output signal from each selector circuit is fed to an output signal generating circuit 118 and 120 respectively which generate the desired output pulses or other appropriate signals in response to a signal from the selection circuit, the output leads from these circuits corresponding to the leads 98 and 100 of FIG. 4. Additionally a pair of level sensitive switches 122 and 124 are connected to each of the selector circuit output leads. When operated by an output signal from the selector circuit these switches function to lock out the opposite selector circuit so that only one output signal will appear. A feedback path is provided from selector circuit 112 through diode 126 to the input of selector circuit 114 for purposes to be hereinafter described.

In operation, as the ramp signal from ramp generator 110 descends in voltage, it reaches the reference potential of reference voltage source 116 or the voltage of the input signal on lead 94 first, depending on whether the input signal on lead 94 is positive or negative in polarity. When the ramp voltage drops slightly below the voltage supplied to either of the selector circuits, the selector circuit begins to generate an output signal. This signal is supplied both to the output signal generating circuit and to the level sensitive switch associated with that selector circuit. The level sensitive switches are made extremely sensitive and operate as soon as any selector circuit output appears. When operated, they lock out the operation of the opposite selector circuit and prevent it from generating any further output signal.

Thus, if the input voltage supplied to selector circuit 114 is less than that supplied by reference voltage, source 116, the ramp voltage will be slightly below reference voltage 116 before it is slightly less than the input voltage on lead 94. This will generate an output signal from selector circuit 112, which will lock out selector circuit 114, and the signal from circuit 112 will be used to operate circuit 118 and generate an appropriate output signal on lead 100. We prefer to use an output circuit which has a threshold such that until the selector circuit output signal has reached a certain level or attained a given value, no output signal will be generated. The level sensitive switches 122 and 124 however, are sensitive to the selector circuit output signal below this minimum or threshold level, and hence selection of one and only one of the two output leads is accomplished before any output signal appears.

Additionally we have found that a feedback path from an appropriate location in the selector circuit to the input of selector circuit 114 prevents any possibility of short or misshapen output signals.

Considering for illustration the example previously described, once the selector circuit 112 has been selected and circuit 114 locked out, the appearance of an output signal on lead 100 cannot change the operation of the device, since the determining level is set by the reference voltage source 116 which is stable and fixed. Further, selection of circuit 112 locks out circuit 114, thus effectively disconnecting lead 94 from the circuit. However, if the input voltage on lead 94 is higher than this reference voltage, and circuit 114 is selected, then an output signal will appear on lead 98. This signal might be fed back to the input lead 94 in such a way as to lower the voltage appearing thereon. Once this signal drops below the ramp voltage being supplied at that time, the selector circuit output signal would disappear, causing a premature disappearance of the output signal on lead 98. To overcome this problem, we provide a feedback signal from a location of appropriate polarity in selection circuit 112 to the input of selection circuit 114 through diode 126. The location in circuit 112 is chosen so that once circuit 112 is locked out, the voltage provided on the feedback lead is such as to insure continued operation of selector circuit 114, despite the signals which may be fed back thereto as a result of providing an output signal. In general, using the polarities discussed, we provide a signal from a point in circuit 112 which rises to a fairly high positive potential when the circuit is locked out, thereby insuring that the ramp voltage will always be below the input signal while the output signal is being generated.

As so far described, the comparator circuit of FIG. 5 has been discussed in terms of a descending ramp voltage, and a pair of output leads. If desired depending upon the system requirements, a single output lead might be provided in which case output circuit 118 might be omitted. Also, it is obvious that a rising ramp signal might be used, the criterion for operation of the selector circuits being that the ramp voltage is slightly greater than the reference input potentials supplied to the selector circuits.

By utilizing the novel multivibrator described above and illustrated in FIG. 1, we have been able to combine the selection and output circuits 112—118 and 114—120 shown in FIG. 5 into two circuits. Thus two selector-output circuits, each corresponding to the circuit of the transistor $T_2$ in FIG. 1, are provided. One but only one of these completes the multivibrator circuit each time a pulse is generated. Because two circuits corresponding to the circuit of transistor $T_2$ in FIG. 1 are provided, their outputs are buffed together before being fed back to the ramp generator circuit, which corresponds to the circuit of transistor $T_1$ in FIG. 1.

It will be recalled, in connection with FIG. 1, that transistor $T_2$ was required to pass a current through resistor 28 to equal the clamping current previously supplied through diode 46 before its collector potential could rise and generate an output pulse. By utilizing this rise in current to operate a level sensitive switch, the opposite selector-output circuit can be locked out before any output pulse is generated by the selected output circuit.

Figure 6:
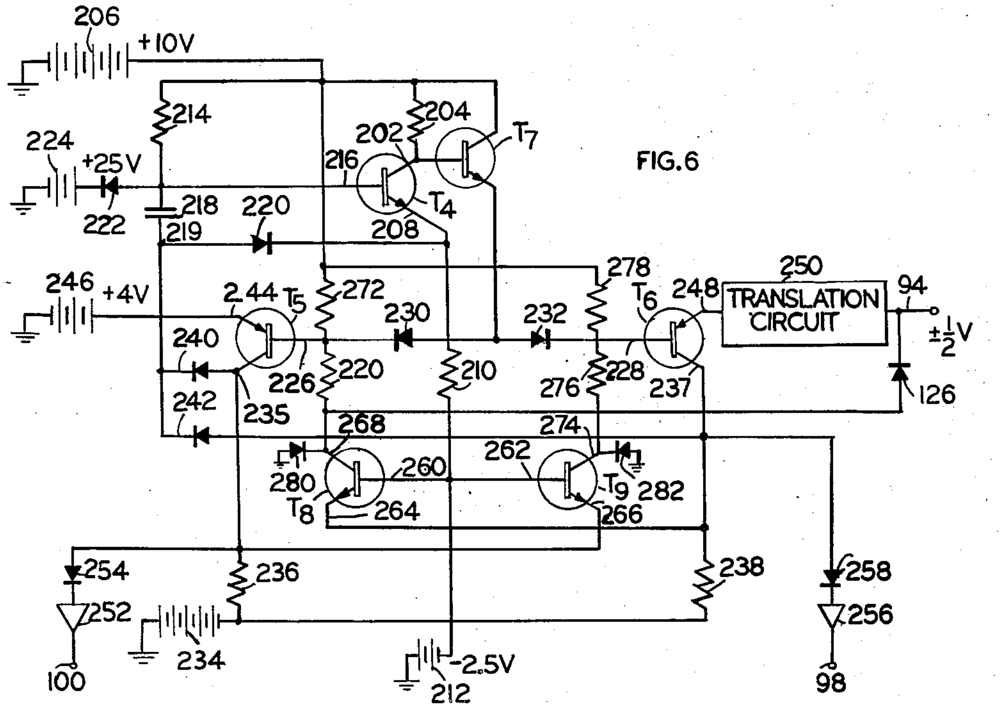
FIG. 6 is a schematic circuit diagram of one embodiment of the clock pulse generator and pulse selector circuits shown in block diagram form in FIG. 4.

The foregoing will be apparent from a consideration of FIG. 6 and the following description which discloses one embodiment of the novel comparator of FIG. 5 utilizing our improved multivibrator.

As shown in FIG. 6, transistor $T_4$ corresponds to transistor $T_1$ of FIG. 1 and transistors $T_5$ and $T_6$ correspond to the transistor $T_2$ shown therein. The circuit of transister $T_4$ forms the ramp generator of FIG. 5, and the circuits of transistors $T_5$ and $T_6$ form the selector-output circuits of FIG. 5. It will be observed that the collector 202 of transistor $T_4$ is connected through a resistor 204 to the voltage source 206, resistor 204 and voltage source 206 corresponding respectively to the resistors 12 and to the voltage source 14 of FIG. 1. Because the collector output signal of transistor $T_4$ must feed both transistors $T_5$ and $T_6$, in contrast to FIG. 1 where the collector signal is connected only to the base of transistor $T_2$, a current amplifier consisting of transistor $T_7$ is provided. Transistor $T_7$ merely provides current amplification for the collector signal appearing at its base terminal.

The emitter 208 of transistor $T_4$ is connected through resistor 210 to the negative voltage source 212, this circuit corresponding exactly to the emitter 18 being connected through the resistor 20 to the voltage source 22 in FIG. 1. Resistor 214 connected between voltage source 206 and the base 216 of transistor $T_4$ corresponds to resistor 40 in FIG. 1 and condenser 218, also connected to the base corresponds to condenser 34 in FIG. 1. The diode 220 connected between one side of capacitor 218 to the emitter 208 of transistor $T_4$ corresponds to the diode 37 of FIG. 1. A clamp is provided by the diode 222 and voltage source 224 similar to the base clamp provided by diode 44 and voltage source 42 in FIG. 1.

As so far described, except for the current amplifier $T_7$, the circuit of FIG. 5 is substantially identical with that of FIG. 1. However, as previously noted, in this circuit two transistors $T_5$ and $T_6$ are provided. The ramp voltage shown in FIG. 2*b* and generated at the collector 202 is applied to the bases of both transistors $T_5$ and $T_6$, 226 and 228 respectively, through the diodes 230 and 232. The collectors 235 and 237 of both transistors are returned to a source of negative voltage 234 through resistors 236 and 238 respectively. The signal appearing at the collectors of each of the transistors $T_5$ and $T_6$ are buffed together by the diodes 240 and 242 and applied to the point 219 of the multivibrator, the point 219 corresponding to the point 52 in FIG. 1.

As so far described, both transistors would be operative in the multivibrator simultaneously if both emitters were returned to a common supply. However, it will be observed that the emitter of transistor $T_5$ is returned to a voltage source 246, which corresponds to the reference voltage source 116 of FIG. 5 while the emitter 248 of transistor $T_6$ is returned to a translation circuit 250, the input lead to which is the lead 94 from the reversing switch 92. As previously explained, the potential on lead 94 varies between $\pm\frac{1}{2}$ volt for example depending upon the polarity of the difference signal appearing on lead 98. The translation circuit 250 translates this voltage variation about 0 volts to a voltage variation about +4 volts and applies this output signal to the emitter 248 of transistor $T_6$. Thus, a constant +4 volt reference signal is supplied to the emitter 244 of transistor $T_5$ and a variable voltage which can vary $\pm\frac{1}{2}$ volt about +4 volts as applied to the emitter 248 of transistor $T_6$.

The multivibrator shown in FIG. 6 operates in the same manner as that shown in FIG. 1. That is, as the voltage at the base 216 of transistor $T_4$ increases as a result of the charging of condenser 218, the potential at the collector decreases with a wave form such as that shown in FIG. 2*b*. This descending ramp is coupled through transistor $T_7$ and diodes 230 and 232 to the bases 226 and 228 of transistors $T_5$ and $T_6$, which are normally non-conducting. When the ramp voltage decreases to a potential slightly below one of the emitters, 244 or 248, the transistor associated with that emitter begins to conduct. The determination as to which transistor between transistor $T_5$ and $T_6$ conducts is determined accordingly by the potential on their emitters. For example, if the potential on the emitter 248 of transistor $T_6$ supplied by the translation circuit is greater than +4 volts, then transistor $T_6$ will begin conducting before transistor $T_5$. On the other hand, if the potential on the emitter of transistor $T_6$ is less than +4 volts, then transistor $T_5$ will begin conducting before transistor $T_6$.

Lockout means, utilizing level sensitive switches to be hereinafter described, are provided to prevent the other transistor from conducting once one of the transistors has begun to operate.

The collectors of both transistors are connected to the point 219 and the voltage rise at the collectors is coupled to the base 216 of transistor $T_4$ by condenser 218. As previously explained, the base 216 rises as a result of the sudden rise in potential at the collectors, and then is limited by the clamp supplied by diode 222 and potential source 224. The clamp for the collectors of transistors $T_5$ and $T_6$, which is supplied by a diode and voltage source 22 in FIG. 1 is supplied in this embodiment by the emitter-base diode of transistors $T_8$ and $T_9$ to be hereinafter described. Following the sudden rise in potential at one or the other of the collectors, and the corresponding sudden rise in the base potential of transistor $T_4$, the condenser 218 charges to a value equal to the clamp voltage, and in so doing the point 219 rises until diode 220 conducts cutting off transistor $T_4$. The action previously described resulting from transistors $T_4$'s being momentarily cut off then occurs and the multivibrator recycles. Output pulses are taken from the collectors of transistors $T_5$ and $T_6$. Thus, output terminal 100 on which a pulse appears when the lead 94 is at a negative potential is connected through amplifier 252 and diode 254 to the collector 235 of transistor $T_5$. Similarly, output terminal 98 is connected to amplifier 256 and diode 258 to the collector of transistor $T_6$.

The lock out circuits which have been previously mentioned include level sensitive switches formed by transistors $T_8$ and $T_9$. As seen in FIG. 6, the bases 260 and 262 of these transistors are connected to the source 212 which is illustratively −2.5 volts. These transistors, as shown, are preferably of the npn type. The emitter 264 of transistor $T_8$ is connected to the collector 237 of transistor $T_6$ and similarly the emitter 266 of transistor $T_9$ is connected to the collector 235 of transistor $T_5$. The collectors of each of these transistors are returned to the bases of transistors $T_5$ and $T_6$ as shown, the bases in turn being connected to a +10 volt source. Thus, for example, collector 268 of transistor $T_8$ is connected through resistor 270 to the base 226 of transistor $T_5$ and this base in turn is connected through the resistor 272 to the source 206. In similar fashion, the collector 274 of transistor $T_9$ is connected through resistor 276 to the base 228 of transistor $T_6$, the base in turn being connected to source 206 through resistor 278. Each of the collectors 268 and 274 is clamped to ground potential, i.e., it is prevented from going below ground potential by the diodes 280 and 282, respectively. As shown, a diode 126 is connected between the collector 268 and input lead 94, to provide a feedback signal as previously explained.

The operation of the level sensitive switches formed by transistors $T_8$ and $T_9$ to provide lockout is as follows. In the normal condition in which transistors $T_5$ and $T_6$ are non-conducting, the collectors of each of transistors $T_8$ and $T_9$ are to provide a return for the +10 volt supply connected to the bases of transistors $T_5$ and $T_6$. The collectors are connected to the negative voltage source 234 through resistors 238 and 236 respectively and the bases are at a −2.5 volt potential.

The emitters of each of these transistors are at their base voltage and are conducting through the resistors 236 and 238 to clamp the collectors of $T_5$ and $T_6$ at −2.5 volts. As previously mentioned, the emitter-base diode of transistors $T_8$ and $T_9$ in the non-conducting state serves the same function as the single clamp diode 46 in FIG. 1. As soon as one of the transistors, $T_5$ and $T_6$ begins to conduct, the potential at its collector, and therefore at the emitter of one of the transistors $T_8$ or $T_9$ begins to rise above the −2.5 volt level. As soon as it does, either transistor $T_8$ or $T_9$ ceases conduction. When conduction in either transistor $T_8$ or $T_9$ ends, the collector current drops to zero and effectively open circuits the lower end of resistor 270 or 276. The potential at the base of transistors $T_5$ or $T_6$ is then free to rise to the 10 volt level, thus effectively opening the switch formed by diode 230 or 232, and preventing further application of voltage to the bases, and also preventing any further conduction by the transistor because of the application of a large positive voltage to the base. Thus, the increase in voltage at the collector of either transistor $T_5$ or $T_6$ causes the disabling of the opposite transistor and the multivibrator selects one or the other of the transistors for operation, depending on the polarity of the input signal supplied on lead 94.

It will be recalled from the timing diagram of FIG. 1, that the transistor $T_2$ in FIG. 1 began conducting at a time $t_1$, but its collector voltage did not rise until the time $t_2$ since this time was required to begin a current flow in the transistor equal to the current previously supplied by the clamp. This is also true in the diagram of FIG. 6. Thus the clamping current in FIG. 6 is passed by the emitter-base diodes of each of the transistors $T_8$ and $T_9$. Before the collector of either transistor $T_5$ and $T_6$ can rise in voltage, there must be sufficient current flow through the transistor to equal the current flowing through the transistors $T_8$ or $T_9$, respectively. In order to equal this current flow, the multivibrator, transistor $T_5$ or $T_6$ must supply current equal to that heretofore supplied by the transistors $T_8$ or $T_9$. In so doing, it will cause current to flow in the level sensitive switch transistors $T_8$ or $T_9$ to cease, thus effectively locking the opposite transistor in the off condition. Accordingly, the selection of which output lead the next pulse is to appear on is made during the $t_1$—$t_2$ interval, before the output pulse is actually generated. The result is to substantially minimize coupling between the pulse generator and the input lead. Effectively, the clock pulse is not generated until after the desired output lead has been selected.

Because of the lock-out feature of our improved comparator circuit discussed above, there is no possibility of pulses appearing on both output leads simultaneously. However, the possibility of coupling or feedback from the output leads to the comparator input leads still exists. From FIG. 6, it will be observed that if transistor $T_5$ is selected then transistor $T_6$ is disabled by the lock-out circuit, and the input lead 94 is effectively disconnected from the circuit. Thus a pulse appearing on lead 100 will have no effect on the circuit operation. It will also be noted that the critical potential in this situation is supplied by the reference voltage source 246, which is fixed and stable.

However, if transistor $T_6$ is selected, an output pulse appearing on lead 98 might be fed back to lead 94, or to other portions of the comparator input circuits and change the level of the voltage appearing there. If, for example, the feedback voltage were to reduce the signal applied to the emitter 248, transistor $T_6$ might prematurely cut-off, thus generating a shortened pulse which would not operate the digital equipment properly.

To avoid this problem, we provide a feedback signal from the collector 268 of transistor $T_8$ to the input lead 94 through diode 126. It will be recalled that before transistor $T_6$ can generate an output signal, the collector of transistor $T_8$ rises to a positive potential of almost 10 volts. This +10 volt potential applied to the input lead 94 through diode 126 makes ineffective any variations in the input voltage supplied on lead 94 to change the input signal. In this manner any possibility of shortened or misshapen pulses resulting from feedback from the output leads to the input lead is avoided.

It will thus be seen that we have provided an improved multivibrator using complementary transistor amplifiers which is capable of providing an output pulse and in which the timing waveform is regenerated at the end rather than the beginning of the output pulse. By proper selection of parameters, multivibrators made according to our invention can provide a signal having a very short duty cycle.

We have also provided an improved comparator circuit for use in analog to digital converters, this circuit avoiding coupling problems heretofore associated with comparator circuits of this type by not generating pulse until the output lead on which the pulse is to appear has been determined, by providing a lock-out feature so that once this output lead has been determined, the pulse cannot appear on the other lead, and also by providing a fixed amount of feedback to compensate for the degenerative feedback present as the result of normal coupling.

It will thus be seen that the objects set forth above, among those made apparent from the preceding description, are efficiently obtained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of our invention herein described, and all statements of the scope of the invention which, as a matter of language, might be said to fall therebetween.

Having described our invention, what we claim as new and desire to secure by Letters Patent is:

1. A multivibrator capable of free running operation comprising, in combination, a pair of transistor amplifiers, each of said amplifiers using a single transistor of a type complementary to that used in the other amplifier, means connecting the output signal of the first amplifier as the input signal to the second amplifier, and means including a capacitor connecting the output signal of said second amplifier as the input signal to the first amplifier, polarity sensitive switching means connected between the side of said capacitor associated with said second amplifier and an electrode of the transistor of said first amplifier other than the base thereof a voltage source, and means connecting said voltage source to the input terminal of said first amplifier.

2. The combination defined in claim 1 which includes clamping means connected to said second amplifier output terminal and said first amplifier input terminal to limit the voltage thereon for one polarity of voltage excursion.

3. The combination defined in claim 1 in which said transistor of said first amplifier is a pnp type and the transistor of said second amplifier is an npn type.

4. The combination defined in claim 1 in which said polarity sensitive switching means is a diode.

5. The combination defined in claim 1 in which said means connecting said voltage source to the input terminal of said first amplifier includes a series resistor.

6. A multivibrator capable of free running operation comprising, in combination, a pair of transistor amplifiers, the first of said amplifiers using an npn transistor and the second of said amplifiers using a pnp transistor, means connecting the output signal of the first amplifier as the input signal to the second amplifier, and means including a capacitor in series connecting the output signal of said second amplifier as the input signal to the first amplifier, said capacitor being connected to the input terminal of said first amplifier, a diode connected between the side of said capacitor associated with said second amplifier and the emitter of said npn transistor, the cathode of said diode being connected to said npn transistor, a voltage source, a resistor connecting said voltage source to the input terminal of said first amplifier, and clamping means connected to said second amplifier output terminal and said first amplifier input terminal to limit the voltage thereon for one polarity of voltage excursion.

7. A multivibrator comprising, in combination, a pair of transistor amplifiers using transistors of complementary type, means connecting the collector of the transistor in a first of said amplifiers to the base of the transistor in a second of said amplifiers, means including a capacitor connecting the collector of the transistor in said second amplifier to the base of said transistor in said first amplifier, means clamping the collector of the transistor in said second amplifier and the base of the transistor in the first amplifier to limit the voltages thereon for one polarity of excursion, polarity sensitive switching means connected between the collector side of said capacitor and the emitter of the first amplifier transistor, a voltage source and means connecting said voltage source to the base of said first amplifier transistor.

8. The combination defined in claim 7 which includes a resistor in series with said capacitor, one end of said resistor being connected to the collector of said second transistor amplifier.

9. The combination defined in claim 7 in which the transistor of said first amplifier is of the npn type, and the transistor of said second amplifier is of the pnp type.

10. The combination defined in claim 7 in which said polarity sensitive switching means is a diode.

11. The combination defined in claim 7 in which said connecting means between said voltage source and the base of said first amplifier transistor includes a series resistor.

12. A multivibrator capable of free running operation comprising, in combination, a pair of transistor amplifiers, a first of said amplifiers using a npn transistor, and a second of said amplifiers using a pnp transistor, means connecting the collector of the npn transistor to the base of said pnp transistor, means including a series capacitor connecting the collector of said pnp transistor to the base of said npn transistor, means clamping the collector of said pnp transistor and the base of said npn transistor to limit the voltages thereon for one polarity of excursion, a diode connected between the collector side of said capacitor and the emitter of said npn transistor, the cathode of said diode being connected to said emitter, a voltage source and a resistor connecting said voltage source to the base of said npn transistor.

13. A multivibrator comprising, in combination, a first transistor of the npn type, a second transistor of the pnp type, means interconnecting the collector of said first transistor and the base of said second transistor, a first positive voltage source, a resistor connecting the collector of said first transistor to said first voltage source, a second voltage source, a resistor connecting the emitter of said first transistor to said second voltage source, a third source of negative voltage, a resistor connecting the collector of said second transistor to said third voltage source, a fourth voltage source, means connecting the emitter of said second transistor to said fourth voltage source, means connecting a capacitor between the base of said first transistor and the collector of said second transistor, means connecting the base of said first transistor to a source of positive potential, a diode connected between the side of said capacitor not connected to the base of said first transistor and the emitter of said first transistor, the cathode of said diode being connected to said emitter, means limiting the base voltage of said first transistor to a maximum positive value less than said first voltage source, and means limiting the maximum negative collector voltage of said second transistor to a value of absolute magnitude less than the absolute magnitude of said third voltage source.

14. The combination defined in claim 13 which includes a resistor connected in series between the collector of said second transistor and said capacitor.

15. A comparator having an input lead and providing an output signal on an output lead depending upon the polarity of an input voltage applied to said input lead comprising, in combination, a pair of selector circuits, means for supplying a signal corresponding to the signal on said input lead to a first of said selector circuits, means for supplying a reference voltage to a second of said selector circuits, a ramp signal generator, means for supplying said ramp signal to both of said selector circuits, said selector circuits producing an output signal when said ramp signal and the input signals supplied thereto are substantially equal in amplitude, a pair of level sensing switching devices, means connecting the output of said selector circuits as inputs to said level sensing switching devices to cause operation of said devices, means connecting the output terminals of said switching devices to the selector circuit not supplying their input signal, operation of said level sensing switching device by the output signal of one of said selector circuits causing the other selector circuit to be rendered inoperative, and means associated with said first selector circuit for generating an output signal when said first selector circuit is selected.

16. The combination defined in claim 15 in which said output signal generating means associated with said first selector circuit provides an output signal only when said selector circuit signal reaches a predetermined level, said level sensing switching devices operating at a lower level of said selector circuit output than said predetermined level.

17. The combination defined in claim 15 which includes means for generating an output signal associated with said second selector circuit for generating an output signal when said second selector circuit is selected.

18. The combination defined in claim 15 which includes means for supplying a regenerative feedback signal from said second selector circuit to the input circuit of said first selector circuit.

19. A comparator having an input lead and providing an output signal on one or the other of a pair of output leads, said comparator comprising, in combination, a pair of selector circuits, means for supplying a signal corresponding to the signal on said input lead to a first of said selector circuits, means for supplying a reference voltage to a second of said selector circuits, a ramp signal generator, means for supplying said ramp signal to both of said selector circuits, said selector circuits producing an output signal when said ramp signal and the input signals supplied thereto are substantially equal in amplitude, a pair of level-sensing switching devices, means connecting the output signal of the first selector circuit as an input signal to a first of said level sensitive switching devices, means connecting the output signal of the second selector circuit as an input signal to a second of said level sensitive switching devices, operation of said first level sensitive switching device causing said second selector circuit to become inoperative and operation of said second level sensitive switching device causing said first selector circuit to become inoperative, output circuits for generating an output signal on said output leads associated with each of said selector circuits and producing an output signal at a predetermined level of selector circuit signal, said level sensitive switching devices being operated by said selector circuit output signals at a level below said predetermined level.

20. The combination defined in claim 19 which includes means for supplying a regenerative feedback signal from said second selector circuit to the input circuit of said first selector circuit.

21. A comparator having an input lead and providing an output pulse on an output lead depending upon the polarity of the voltage applied to said input lead comprising, in combination, a ramp signal generator, a pair of selector circuits, means connecting said ramp signal to each of said selector circuits, means for supplying a signal corresponding to the signal on said input lead to a first of said selector circuits, means for supplying a reference signal to a second of said selector circuits, means connecting the output signals from said selector circuits as input signals to said ramp generator, said ramp generator and said first or said second selector circuit constituting a pulse generating multivibrator, a pair of level sensitive switching devices, said level sensitive switching devices normally holding said selector circuits in the operate condition, means connecting the output signal of the first selector circuit as an input signal to a first of said switching devices, means connecting the output signal of the second of said selector circuits as an input signal to a second of said switching devices, operation of either of said switching devices in response to a selector output signal rendering the opposite selector circuit inoperative and permitting the multivibrator formed by the other operative selector circuit and said ramp generator to generate a pulse, and means connecting the output terminal of said first selector circuit to said output lead.

22. The combination defined in claim 21 which includes a second output lead and means connecting said second output lead to said output terminal of said second selector circuit.

23. The combination defined in claim 21 which includes means supplying a regenerative feedback signal from said second selector circuit to the input terminal of said first selector circuit.

24. A comparator having an input lead and providing an output pulse on an output lead depending upon the polarity of an input voltage applied to said input lead comprising, in combination, a first transistor amplifier, a second transistor amplifier, a third transistor amplifier, said second and third amplifiers each using a single transistor of the same type as the other, the first of said transistor amplifiers using a transistor of a type complementary to that used in said second and third amplifiers, means connecting the output of said first amplifier as the input signal to said second and third amplifiers, means including a capacitor connecting the output signal of said second and third amplifiers as the input signal to said first amplifier, polarity sensitive switching means connected between the side of said capacitor associated with said second and third amplifiers and the output terminal of the transistor of said first amplifier, a voltage source, means connecting said voltage source to the input terminal of said first amplifier, said first amplifer and either said second or said third amplifier forming a multivibrator in which said second or said third amplifier is normally nonconducting, and means responsive to the polarity of the voltage on said input lead for selecting said second or said third amplifier as part of said multivibrator, and means connecting the output lead of said comparator to said second amplifier output terminal.

25. The combination defined in claim 24 which includes clamping means connected to the output terminals of said second and third amplifiers and to the input terminal of said first amplifier to limit the voltage thereon for one polarity of voltage excursion.

26. The combination defined in claim 24 which includes means for preventing conduction of the transistor in the other amplifier once selection of said second or said third amplifier as part of said multivibrator has been accomplished.

27. The combination defined in claim 24 which includes means for coupling a substantial regenerative voltage from one of said second or said third amplifiers to said input terminal.

28. The combination defined in claim 24 in which said first amplifier includes a pnp type transistor and said second and third amplifiers include npn transistors.

29. The combination defined in claim 24 in which said polarity sensitive switching means is a diode.

30. The combination defined in claim 25 in which said clamping means for said second and third amplifier output terminals includes a voltage source and the emitter-base diode of a transistor connected between said voltage source and the output terminal of said amplifier, means connecting the collectors of said clamping transistors to the input terminal of the amplifier whose output terminal its emitter-base diode is not clamping, and means connecting said amplifier input terminal to a voltage source.

References Cited in the file of this patent

UNITED STATES PATENTS

| | | |
|---|---|---|
| 2,788,449 | Bright | Apr. 9, 1957 |
| 2,827,574 | Schneider | Mar. 18, 1958 |
| 2,840,727 | Guggi | June 24, 1958 |
| 2,896,094 | Moody et al. | July 21, 1959 |